(12) United States Patent
Eddins

(10) Patent No.: US 9,613,435 B1
(45) Date of Patent: Apr. 4, 2017

(54) COLOR MAPS

(71) Applicant: The MathWorks, Inc., Natick, MA (US)

(72) Inventor: Steven L. Eddins, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 125 days.

(21) Appl. No.: 14/335,588

(22) Filed: Jul. 18, 2014

(51) Int. Cl.
*G06T 11/00* (2006.01)
*G09G 5/02* (2006.01)

(52) U.S. Cl.
CPC .............. *G06T 11/001* (2013.01); *G09G 5/02* (2013.01)

(58) Field of Classification Search
CPC .................................................. H04N 1/6058
See application file for complete search history.

(56) References Cited

U.S. PATENT DOCUMENTS

| | | | | |
|---|---|---|---|---|
| 5,416,890 | A * | 5/1995 | Beretta ............... | G06F 3/04845 345/440 |
| 2002/0036786 | A1 * | 3/2002 | Kondo .................. | H04N 1/603 358/1.9 |
| 2006/0244983 | A1 * | 11/2006 | Zeng .................... | H04N 1/6058 358/1.9 |
| 2012/0096380 | A1 * | 4/2012 | Wagner ............... | G06F 3/04847 715/771 |
| 2014/0240343 | A1 * | 8/2014 | Tremblay ............. | G06T 11/001 345/594 |

OTHER PUBLICATIONS

Aisch, "Mastering Multi-hued Color Scales with Chroma.js", https://vis4.net/blog/posts/mastering-multi-hued-color-scales/, Sep. 9, 2013, 13 pages.
Borkin et al., "Evaluation of Artery Visualizations for Heart Disease Diagnosis", IEEE Transactions on Visualization and Computer Graphics, Aug. 1, 2011, 10 pages.
Borland et al., "Rainbow Color Map (Still) Considered Harmful", IEEE Computer Graphics and Applications, Mar./Apr. 2007, pp. 14-17.

(Continued)

*Primary Examiner* — Antonio A Caschera
(74) *Attorney, Agent, or Firm* — Harrity & Harrity, LLP

(57) ABSTRACT

A computer-implemented method for generating a color map using a color space, the generating including selecting lightness points representing lightness values, generating a lightness plot based on the lightness points, the lightness plot non-linearly increasing from a minimum lightness value to a maximum lightness value, and selecting chromaticity points, where the chromaticity points are represented using a plurality of dimensions, and the chromaticity points representing chromaticity values. The method includes generating a chromaticity plot based on the chromaticity points, and associating chromaticity values along the chromaticity plot with respective lightness values along the lightness plot, the associating specifying a plurality of colors. The method also includes identifying an in-gamut range for an RGB representation of the plurality of colors, the RGB representation provided in an RGB color space, and converting the color map from the color space to the RGB color space.

20 Claims, 16 Drawing Sheets
(11 of 16 Drawing Sheet(s) Filed in Color)

(56) References Cited

OTHER PUBLICATIONS

Brewer et al., "ColorBrewer 2.0: Color Advice for Cartography", http://colorbrewer2.org/, Apr. 23, 2009, 1 page.
Cresspahl, "The 'jet' Colormap Must Die! or: how to improve your map plots and create your own nice colormaps", http://cresspahl.blogspot.com/2012/03/expanded-control-of-octaves-colormap.html, Mar. 7, 2012, 8 pages.
Green, "Dave Green's "cubehelix" colour scheme", http://www.mrao.cam.ac.uk/~dag/CUBEHELIX/, Dec. 31, 2010, 4 pages.
Jacomy, "i want hue", http://tools.medialab.sciences-po.fr/iwanthue/, Feb. 11, 2013, 2 pages.
Kindlmann et al., "Face-Based Luminance Matching for Perceptual Colormap Generation", IEEE, 2002, 8 pages.
Kosara, "How the Rainbow Color Map Misleads", http://eagereyes.org/basics/rainbow-color-map, 2013, 17 pages.
Light, "The End of the Rainbow? Color Schemes for Improved Data Graphics", EOS, Transactions of the American Geophysical Union, vol. 85, No. 40, Oct. 2004, pp. 385, 391.
NASA Ames Research Center, "Color Tool", http://colorusage.arc.nasa.gov/ColorTool.php, Jul. 31, 2004, 3 pages.
Niccoli, "The Rainbow is Dead . . . Long Live the Rainbow!", http://mycarta.wordpress.com/2012/05/29/the-rainbow-is-dead-long-live-the-rainbow-series-outline/, Series Outline, May 29, 2012, 2 pages.
Rogowitz, "The Rainbow Color Map", http://root.cern.ch/drupal/content/rainbow-color-map, Feb. 7, 2013, 8 pages.
Rogowitz, "The "Which Blair Project": A Quick Visual Method for Evaluating Perceptual Color Maps", IEEE, 2001, 10 pages.
Rogowitz, "Why Should Engineers and Scientists be Worried About Color?" http://www.research.ibm.com/people/l/lloydt/color/color.HTM, 1995, 13 pages.
Rogowitz, "Data visualization: the end of the rainbow", IEEE Spectrum, Dec. 1998, pp. 52-59.
Simmon, "Subtleties of Color", http://blog.visual.ly/subtleties-of-color/, Aug. 5, 2013, 7 pages.
Simmon, "Use of Color in Data Visualization", http://earthobservatory.nasa.gov/resources/blogs/intro_to_color_for_visualization.pdf, May 22, 2011, 3 pages.
Skau, "Dear NASA: No More Rainbow Color Scales, Please", http://blog.visual.ly/rainbow-color-scales/, Apr. 4, 2012, 6 pages.
Spence et al., "Using Color to Code Quantity in Spatial Displays", Journal of Experimental Psychology: Applied, vol. 5, No. 4, 1999, pp. 393-412.
Van Slembrouck, "There's Something About Yellow", http://blog.visual.ly/the-use-of-yellow-in-data-design/, Dec. 7, 2011, 7 pages.
Ware, "Color Sequences for Univariate Maps: Theory, Experiments, and Principles", IEEE Computer Graphics and Applications, 1988, pp. 41-49.

* cited by examiner

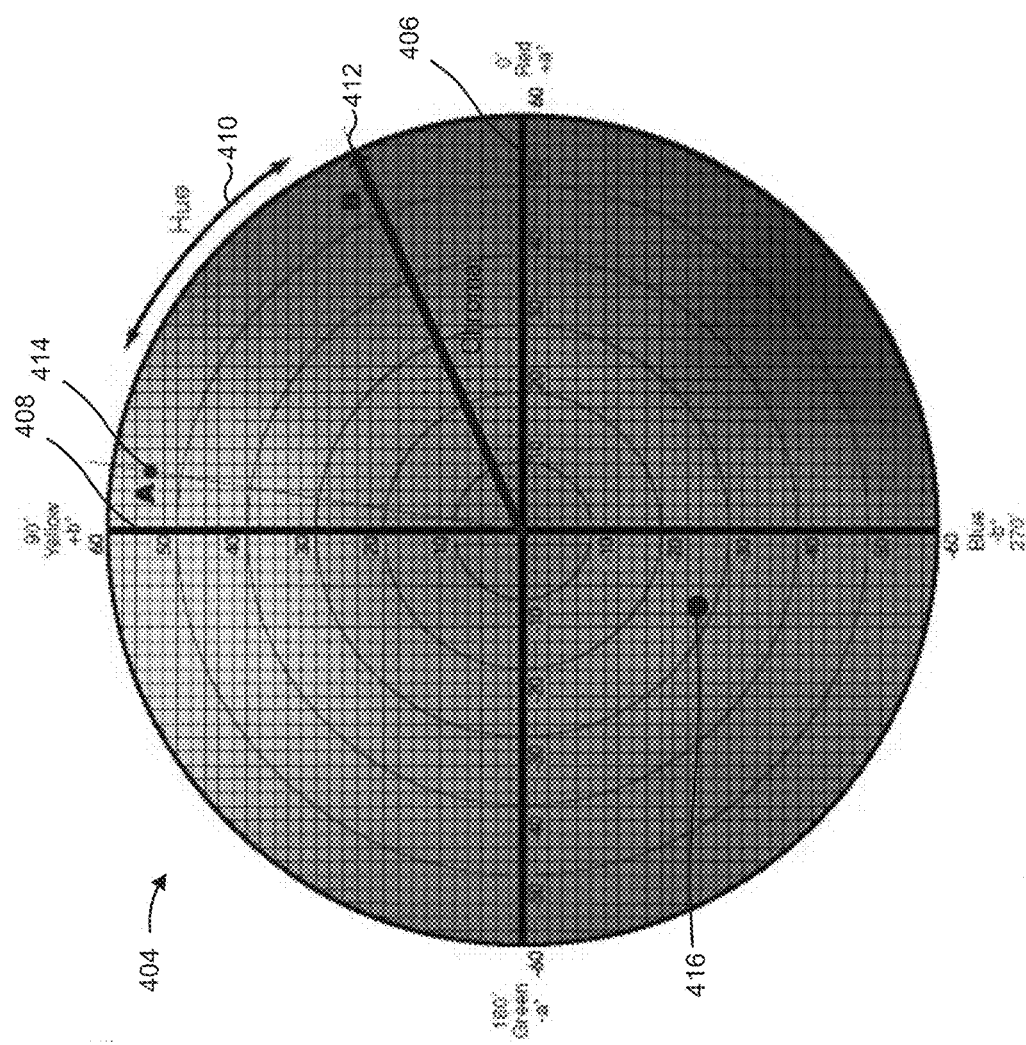

COLOR MAPS

BACKGROUND

Data can be presented in various ways. In some presentations of data, color is used to help represent data values. For example, a bar graph may use different colors to represent different values. A color map may be used to select colors to represent the data. The color map may include a range of colors placed in an order to represent the range of the data. For example, a monochromatic color map may range from a dark blue to a light blue. The dark blue may be used to represent a minimum value of the data and the light blue may be used to represent a maximum value of the data. Data values that fall in between the minimum and maximum values may be assigned shades of blue interpolated between the dark blue and the light blue. The resulting data presentation may allow a viewer of the presentation to more easily understand relative values of the data.

BRIEF DESCRIPTION OF THE DRAWINGS

The accompanying drawings, which are incorporated in and constitute a part of this specification, illustrate one or more embodiments described herein and, together with the description, explain these embodiments. The patent or application file contains at least one drawing executed in color. Copies of this patent or patent application publication with color drawing(s) will be provided by the Office upon request and payment of the necessary fee. In the drawings:

FIG. 4B illustrates an exemplary color chart;

DETAILED DESCRIPTION

The following detailed description of example implementations refers to the accompanying drawings. The same reference numbers in different drawings may identify the same or similar elements.

Color may be used to represent data (e.g., on a graph, chart, map, etc.). A color map may provide a context to the colors used in representing the data. A user may generate the color map to use in representing the data. For example, the user may select a set of colors and place the selected colors in an order to generate a color map.

Figure 1A:
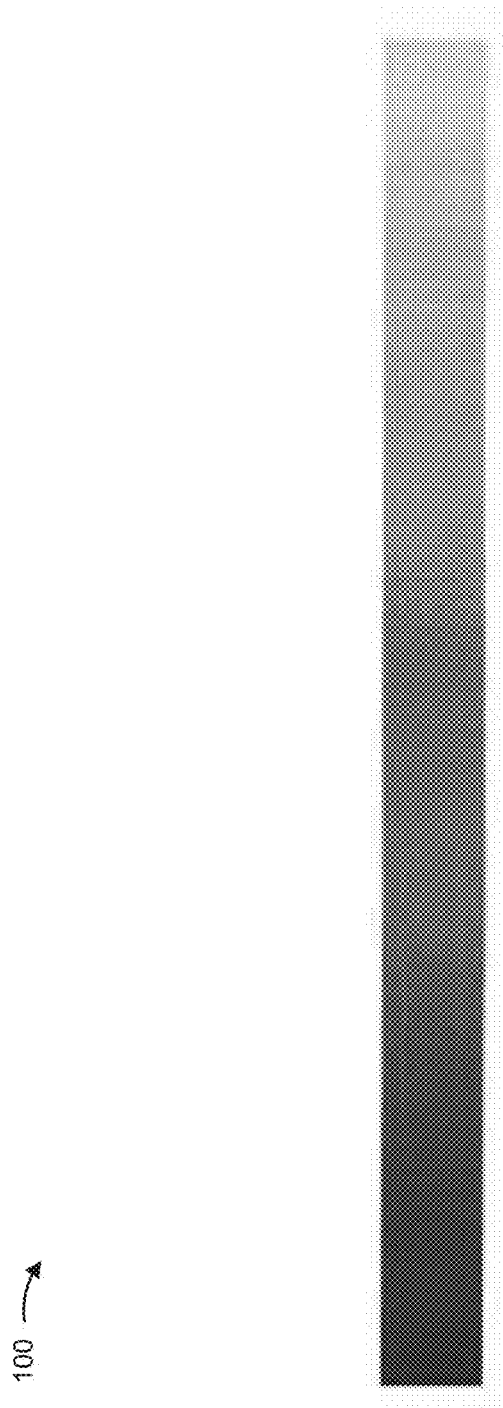
FIG. 1A illustrates an exemplary color map.

The color map may have characteristics that allow an effective representation of data. For example, FIG. 1A shows an example color map 100. The colors of the color map may increase or decrease monotonically in lightness (e.g., luminance, a measure based on luminance, etc.). A color map that increases (or decreases) in lightness from one end of the color map to the other may allow a viewer of the data to more easily perceive relative values of the data represented using one or more colors. Further, the increasing (or decreasing) lightness may allow the data to be more easily perceived in monochromatic displays of the data (e.g., a black and white printout of a color display).

Another example characteristic of the color map may include a perceptually uniform spacing of the colors of the color map. For example, a perceived distance between each of the colors on color map 100 may be substantially similar. A perceptually uniformly spaced color map may allow the viewer of the data to more easily perceive distances between data values based on the color of the represented data. A perceptually uniformly spaced color map may also imply or result in a color map with an ordering of colors that transitions gradually from one end of the map to the other.

Another example characteristic of the color map may include a minimum saturation of the colors of the color map. For example, colors with a higher saturation may be perceived as colorful, as opposed to dull or grayish shade of the color as may occur when saturation is lower. The higher saturation of the colors may allow for a clearer distinction between colors of the color map.

In some embodiments, a color map may include a set of colors with a perceptually uniform spacing and that span at least a minimum section of a color space. For example, the color map may start in a blue or purple section of a color space and span across a set of colors traditionally considered cool colors and into one or more of a set of colors traditionally considered warm colors. Conversely, the color map may start with a warm color and span the set of warm colors and into one or more of the set of cool colors. Other such minimum color spans in the color space can be used.

A color map generator may assist the user in generating the color map. Generating a color map that includes characteristics such as perceptually uniform spacing and/or an increasing lightness of the colors may be non-trivial. For example, a color map may be generated by selecting colors in a first color space, such as the L*a*b* color space developed by the International Commission on Illumination (Commission Internationale de l'Eclairage (CIE)). In some embodiments, this color space may be a design color space in that a user or designer creates a desired color map using, for example, the L*a*b* color space.

A different, second color space (such as red, green, blue (RGB)) may be used to display data colored using the color map. In some embodiments, this color space may be referred to as a deployment color space since this color space may be used to display a color map on an output device, such as a computer display. Selecting the colors in the design color space to include characteristics that allow for an effective color map while ensuring the color map remains in gamut for display in the deployment color space may be non-trivial. For example, the design and deployment color spaces may be non-linearly related to each other such that a slight change in the design color space produces a significant change in the deployment color space. The color map generator may allow the user to select colors in the design color space and interactively determine whether the resulting color map is in gamut in the deployment color space.

In some embodiments, color map 100 includes a set of selected colors. For example, the selected colors may start from a dark blue or a purple color at one end of color map 100 and end with a yellow color at another end of color map 100. The selected colors may include a lighter blue color, a green color, and an orange color located between the blue/purple and the yellow colors. In some embodiments, color map 100 may include gradations between the selected colors, for example, by interpolating between the selected colors. For example, color map 100 may include a number (e.g., 10, 20, 30, etc.) of selected colors spaced along the range of color map 100, with colors located between the number of selected colors generated by interpolating between the selected colors.

The selected colors of color map 100 may be increasing in lightness as the map is traversed in a direction, e.g., left to right in FIG. 1A. In some embodiments, the increase in lightness may be a monotonic increase in lightness. Additionally or alternatively, the increase in lightness may be a strictly monotonic increase in lightness. For example, color map 100 starts at purple and ends at yellow, which is considered to be relatively lighter than purple. The selected colors in between the purple and the yellow are each lighter than the previous selected color, going from the purple to the yellow. In a similar manner, in alternative embodiments, color map 100 may decrease in lightness. In some embodiments, the monotonic increase in lightness may be configured to be not strictly monotonic. Alternatively or additionally, allowing the increase in lightness to be non-linear may allow the color map to remain in gamut while maintaining other characteristics of the color map.

The selected colors of color map 100 may be perceptually uniformly spaced. For example, the perceived distance between each of the selected colors of color map 100 may be substantially similar. For example, the color map 100 may be used to represent data. If the data includes values from 0 to 50, the perceptual difference in the colors representing 10 and 15 may be substantially similar to the perceptual difference between the colors representing 35 and 40.

Further, the selected colors may be perceptually uniformly ordered so that adjacent selected colors may appear perceptually close. For example, the selected color adjacent to the yellow at the right side of color map 100 may be orange, as orange may be perceptually close to yellow. In some embodiments, the selected colors of color map 100 may include colors with a minimum saturation value.

While FIG. 1A shows one example color map 100, the color map may start and end with different colors than those shown in color map 100. In some embodiments, the starting and ending colors may span a minimum range of colors in a color space.

Figure 1B:
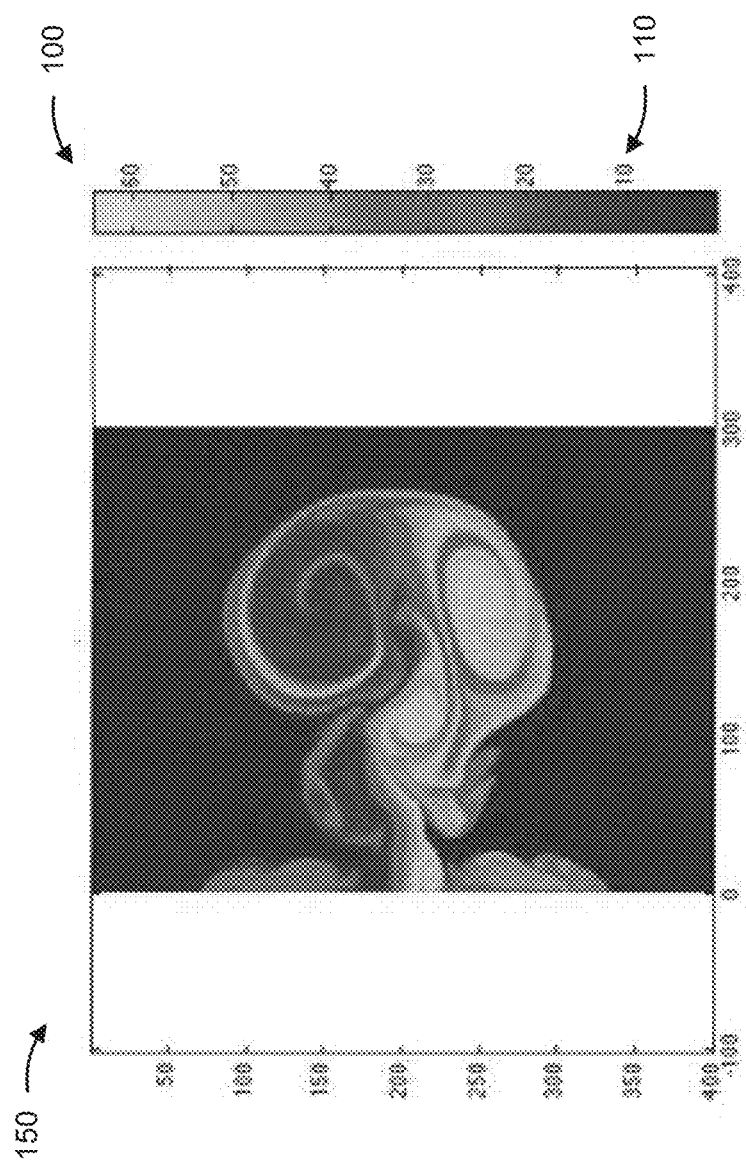
FIG. 1B illustrates an exemplary data representation.

FIG. 1B shows an example data representation 150 using color map 100. Data representation 150 may include color map 100. Data representation 150 may be colored according to the colors of color map 100 corresponding to the data values in data representation 150. The colors that correspond to the data values may be indicated by data values 110 positioned next to color map 100. For example, data values 110 in data representation 150 may span from 0 to a little greater than 60. The numbers 10, 20, 30, 40, 50, and 60 may be placed next to markings on color map 100 to show the colors corresponding to the numbers. Data representation 150 may use colors to help show the values of the underlying data.

Figure 2:
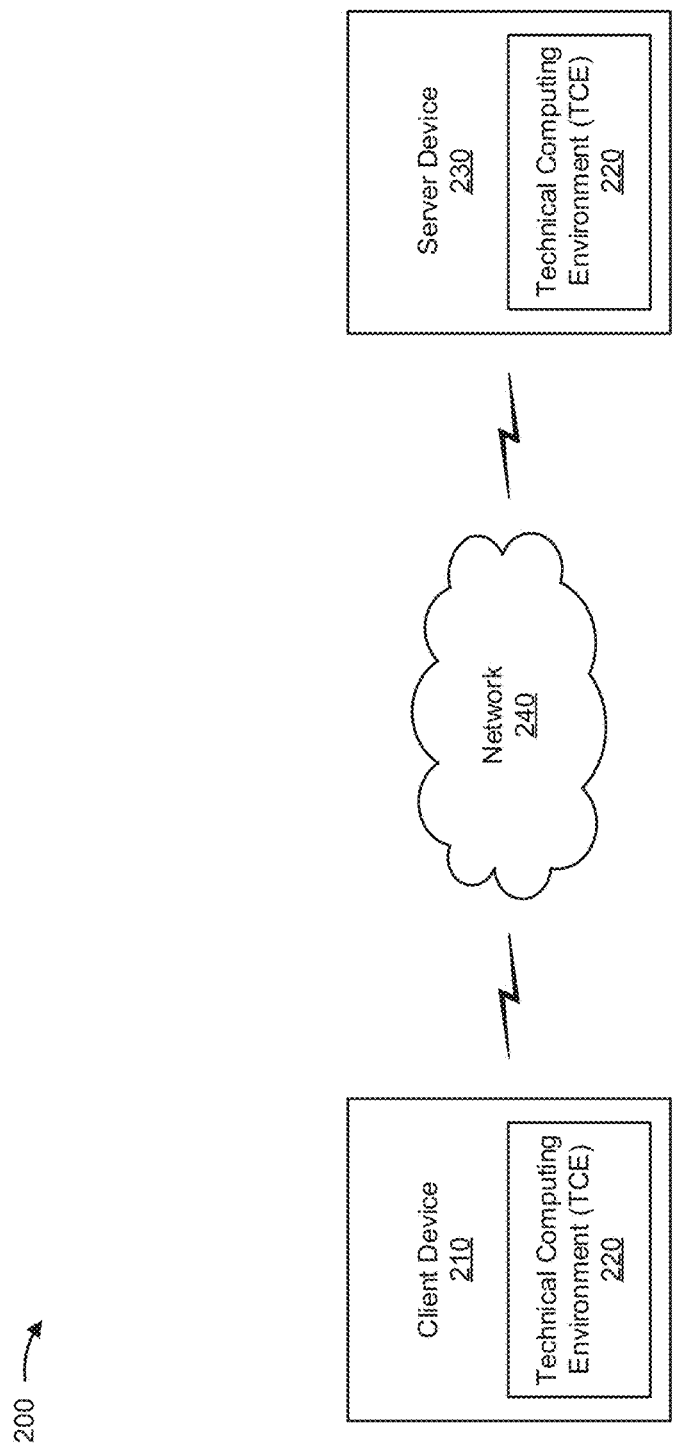
FIG. 2 is a diagram of an example environment in which system and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., non-code, a link between code and non-code, a document that includes code and non-code, etc.). For example, client device 210 may include a computing device, such as a desktop computer, a laptop computer, a tablet computer, a mobile phone (e.g., a smart phone, a radiotelephone, etc.), or a similar device. Client device 210 may compile and/or execute program code, and may ignore non-code portions when compiling and/or executing the program code. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. In some implementations, TCE 220 may include a programming environment capable of executing program code. For example, TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). TCE 220 may include a programming environment capable of executing the input program code. In some implementations, TCE 220 may permit the user to input non-code (e.g., a comment, plain text, rich text, an image, a video, a simulation, etc.) via the code editor. Additionally, or alternatively, TCE 220 may include a non-code editor portion that permits the user to input non-code.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Network 240 may include hardware (e.g., routers, switches, optical fibers, etc.) and software to allow communication among two or more devices, such as client device 201 and server 230.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Also, while client device 210 and server device 230 are shown including TCE 220, some embodiments may include devices without TCE 220. For example, color maps may be generated and/or data may be represented using color maps on any appropriate computing device.

Figure 3:
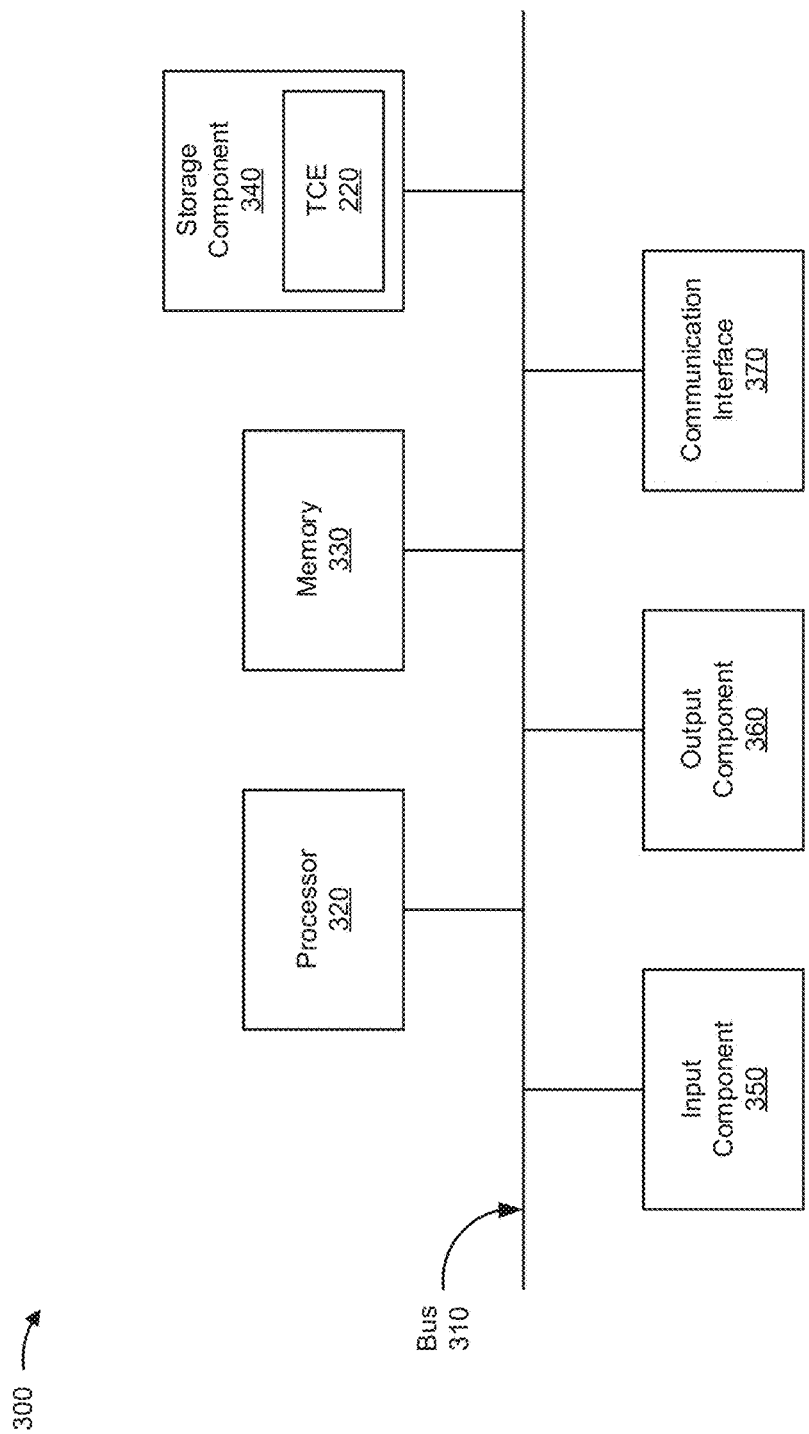
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture), and/or that is designed to perform one or more computing tasks. In some implementations, processor 320 may include multiple processor cores that can allow, for example, parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive inputs. Inputs can be received on behalf of a user or from devices, such as sensors, interfaces, etc. Examples of input components can include, but is not limited to a touch screen display, a keyboard, a keypad, a mouse, a button, a switch, an accelerometer, a microphone etc. Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4A:
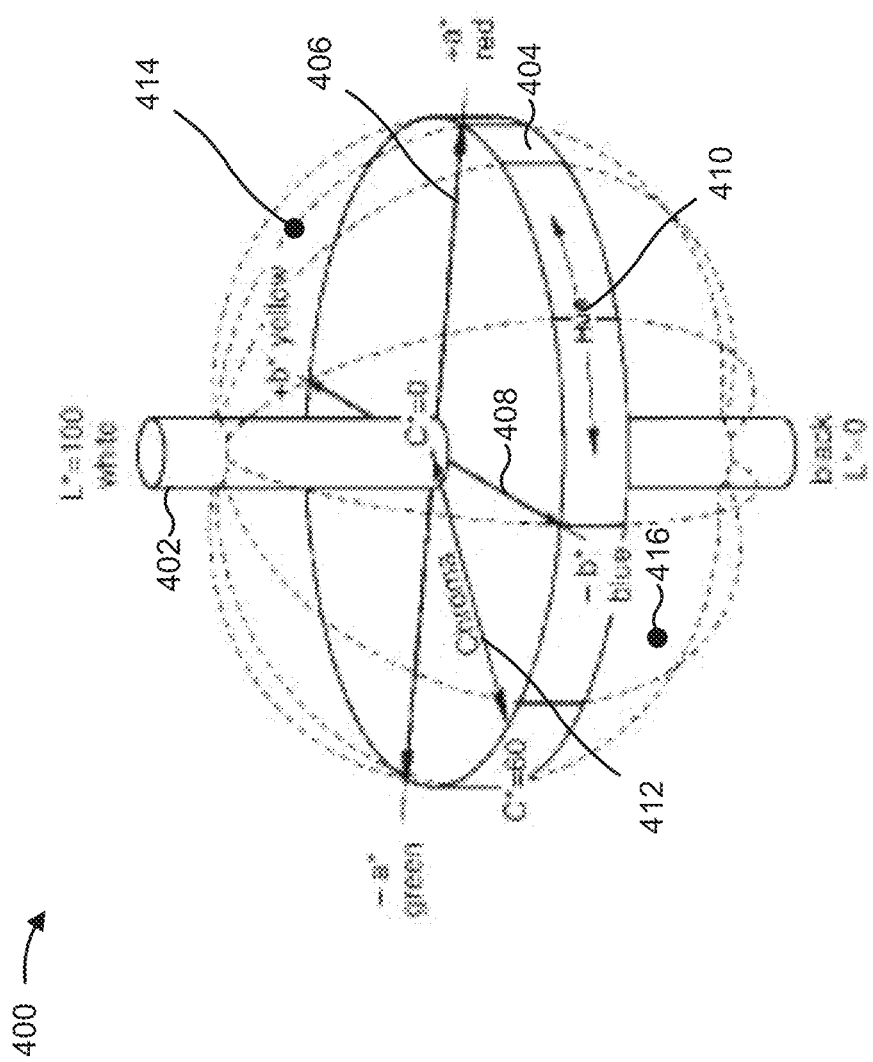
FIG. 4A illustrates an exemplary color chart.

FIG. 4A illustrates an example color chart 400 of an example color space, such as the L*a*b* color space. Color spaces may be used to describe and specify colors, such as on computer displays. For example, each color may be described by a set of numbers representing components of the color. For example, in the L*a*b* color space, the components of each color may include lightness and chromaticity. Lightness may be a function of a luminance of the color, and represented by an L* axis 402. Chromaticity may be a function of hue and chroma (or saturation) and represented by a chromaticity plane 404 defined by an a* axis 406 and a b* axis 408. The a* axis 406 represents a red/green value of the color and b* axis 408 represents a yellow/blue value of the color.

An example color may be specified as a point 414 in color chart 400. The position of point 414 on L* axis 402 may determine the lightness of the color. For example, a color (e.g., specified by point 414) that is closer to top of L* axis 402 may be perceived as lighter than a color (e.g., specified by a point 416) that is closer to the bottom of L* axis 402. L* axis 402 may have a range from 0 at the bottom of L* axis 402 to 100 at the top of L* axis 402.

Point 414 specifying the example color may also be positioned along a* axis 406. For example, a color (e.g., specified by point 414) that is closer to the right end of a* axis 406 (a more positive a* value) may be perceived as more red, while a color (e.g., specified by point 416) closer to the left end of a* axis 406 (a more negative a* value) may be perceived as more green. Point 414 specifying the example color may also be positioned along b* axis 408. For example, a color (e.g., specified by point 414) that is closer to the top of b* axis 408 (a more positive b* value) may be perceived as more yellow, while a color (e.g., specified by point 416) closer to the bottom of b* axis 408 (a more negative b* value) may be perceive as more blue. Colors may be a mix of the colors represented by the axes.

FIG. 4B illustrates chromaticity plane 404 of example color chart 400. Again, chromaticity plane 404 is defined by a* axis 406 (ranging from green to red) and b* axis 408 (ranging from blue to yellow). Chromaticity plane 404 may also express hue 410 and chroma 412 of a specific color. Hue 410 may be expressed as an angular measurement on chromaticity plane 404. For example, the positive portion of a* axis 406 may be defined as zero degrees and hue 410 of a point at zero degrees may be red. As the angular measurement increases toward the positive portion of b* axis 408, the hue transitions from red to orange to yellow. Continuing around chromaticity plane 404, the hue transitions from yellow to green at 180 degrees (i.e., the negative portion of a* axis 406), then from green to blue at 270 degrees (negative portion of b* axis 408) and back to red at 0 degrees (positive portion of a* axis 406).

Chromaticity plane 404 may express chroma 412 of a specific color as a distance from an origin of chromaticity plane 404 (i.e., the intersection of the a* 406 and b* 408 axes). For example, point 416, closer to the origin may specify a color that is more grayish, while point 414, further from the origin of chromaticity plane 404 may specify a color that is more vivid and colorful. If a point closer to the origin and a point further from the origin lie on a same angular degree, the two specified colors may be a same hue, while differing in saturation of the color.

While the L*a*b* color space has been described here, other color spaces may be used. In some embodiments, a first color space (such as L*a*b*, other CIE color spaces, etc.) may provide a design color space that is more perceptually uniform than a second, deployment color space. For example a deployment color space (such as RGB; cyan, magenta, yellow, key (CMYK); etc.) may be used to specify colors for display (e.g., on a computer display, printer, etc.). Selecting a color map that is perceptually uniform may be easier in the design color space than the deployment color space. However, the design and deployment color spaces may have different gamuts, which may result in colors that can be selected in the design color space but cannot be displayed in the deployment color space.

Figure 5A:
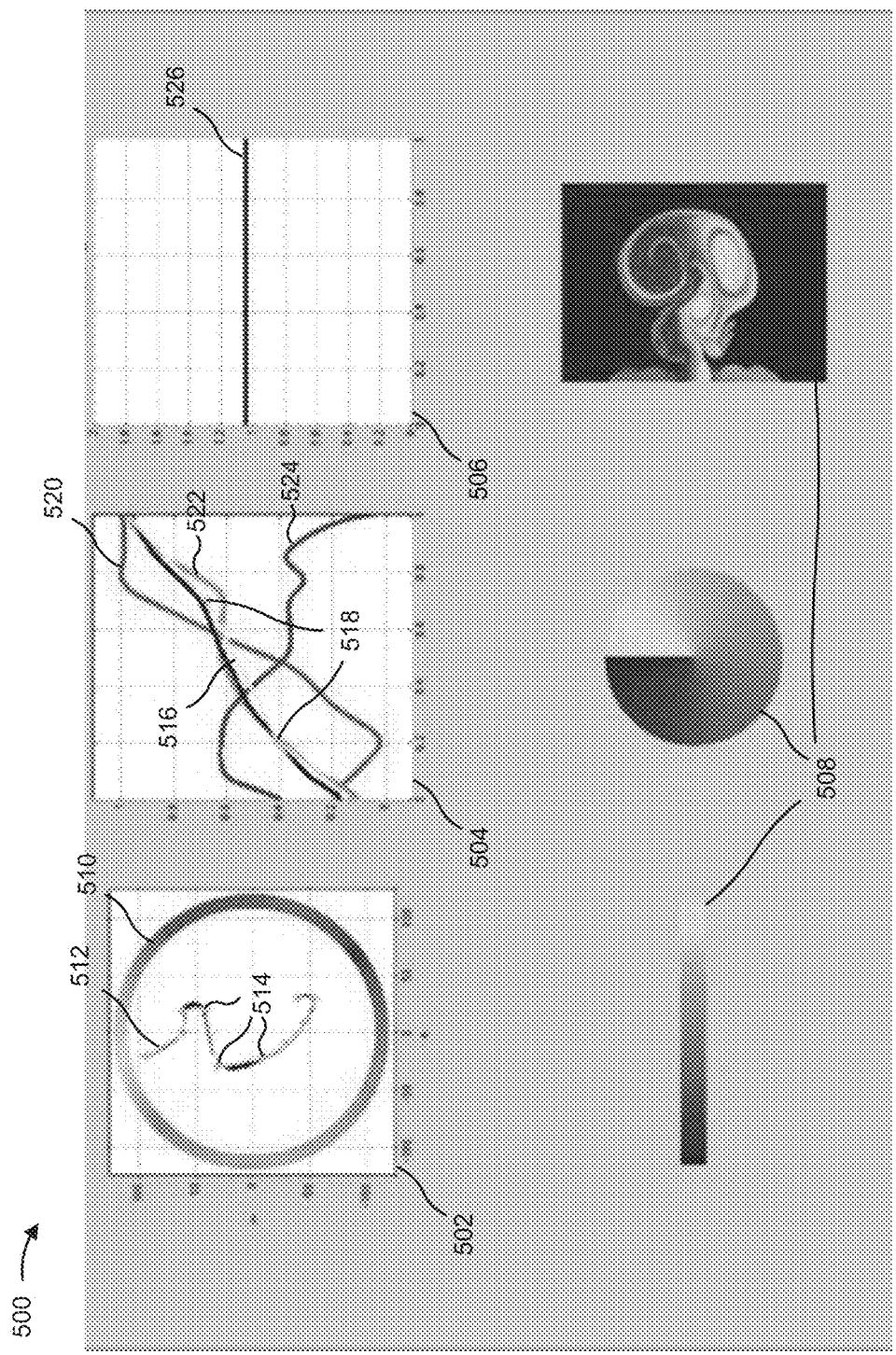
FIG. 5A illustrates an exemplary system for generating color maps.

FIG. 5A illustrates an example interface 500 of an example system for generating color maps. In an embodiment, interface 500 may include three panels 502, 504, 506, collectively panels 502. Panels 502 allow a user to interact with different components of a color map. Interface 500 may also include example outputs 508, which may display a resulting color map based on the inputs from panels 502, 504, 506.

A first panel 502 on interface 500 may correspond to a component of color in a design color space, such as the chromaticity plane of the L*a*b* space described above. In some embodiments, first panel 502 includes a ring 510 representing the chromaticity plane, which may show the hues of the chromaticity plane. Interface 500 may display, using an interior region of ring 510, a chromaticity plot 512 described by chromaticity points 514. Chromaticity plot 512 may be used to define the hues of the colors selected for the color map, as well as the ordering of the hues for selected colors. For example, chromaticity points 514 of chromaticity plot 512 may correspond to coordinates on the chromaticity plane 404. The hues of the selected colors may be those defined by the coordinates of some or all of chromaticity points 514.

Chromaticity plot 512 may be modified by the user to adjust the resulting color map. For example, the user may move a chromaticity point 514 (e.g., by selecting and dragging chromaticity point 514 using a mouse or a touch screen) to a different position to alter chromaticity plot 512. The user may also lengthen or shorten chromaticity plot 512, for example, by dragging an end chromaticity point to a different position. The resulting color map may be displayed in example outputs 508 to show the changes produced by adjusting chromaticity plot 512.

In some embodiments, chromaticity points 514 may refer to points that the user may manipulate, with chromaticity plot 512 interpolated between chromaticity points 514. The user may add more chromaticity points 514 to chromaticity plot 512 to add more inflection points of chromaticity plot 512. Inflection points may include points on a chromaticity or other plot at which a slope and/or an angle of curvature of the plot changes. In other embodiments, chromaticity points 514 may refer to all the points of chromaticity plot 512. The user may manipulate a subset or all of the points of chromaticity plot 512 based on a desired design goal.

A second panel 504 on interface 500 may correspond to another component of color in the design color space, such as lightness of the color (e.g., the L* axis of the L*a*b* space described above). In some embodiments, second panel 504 includes a lightness plot 516 described by lightness points 518. Similar to chromaticity plot 512, lightness plot 516 may be adjusted by the user by repositioning one or more lightness points 518. Adjusting lightness plot 516 may result in changes to the output color map, which may be displayed on one or more example outputs 508.

Second panel 504 may also include plots reflecting a deployment color space. For example, second panel 504 may include a red plot 520, a green plot 522, and a blue plot 524 to reflect an RGB color space. RGB plots 520, 522, 524 may reflect the components of the colors in the color map resulting from the inputs of chromaticity plot 512 and lightness plot 516. In some embodiments, as the user adjusts chromaticity plot 512 and/or lightness plot 516, RGB plots 520, 522, 524 may adjust to reflect the changes in the resulting color map. The changes in the resulting color map may also be reflected in example outputs 508. In an embodiment, changes to chromaticity plot 512 and/or lightness plot 516 may be transformed and shown in window 504 in substantially real-time, thus allowing a user to perform interactive color map design. Embodiments further allow the user to determine, in substantially real-time, whether the resulting color map will be in gamut on an output device. In some embodiments, the user may conversely make adjustments in red plot 520, green plot 522, and/or blue plot 524 to change the resulting color map. The adjustments to one or more of RGB plots 520, 522, 524 may produce changes to chromaticity plot 512 and/or lightness plot 516, which may be incorporated and reflected in first panel 502 and/or second panel 504.

A third panel 506 on interface 500 may correspond to a characteristic of the color map, such as perceived difference between the colors. Third panel 506 may include a difference plot 526 that shows the perceived difference between the colors in the color map. A flat line represents a uniform perceived difference between the colors of the color map. A sloped line would represent changing perceived differences; as the value of the line increases, the perceived difference between adjacent colors would become greater. The user may adjust difference plot 526 to change the perceived difference between the colors. Adjusting difference plot 526 may result in changes to chromaticity plot 512 and/or lightness plot 516, which may be reflected in first panel 502 and/or second panel 504. Conversely, adjustments to chromaticity plot 512 and/or lightness plot 504 may result in changes in difference plot 526, which may be reflected in third panel 506. While difference plot 526 is shown as flat, color maps with non-uniform perceived differences may also be generated.

While interface 500 of FIG. 5A shows three panels, more or fewer panels may be used. For example, respective ones of RGB plots 520, 522, 524 may be shown in separate panels. Alternatively or additionally, more color spaces may be depicted, such as a set of CMYK plots, either in one of panels 502, 504, 506 or in one or more separate panels. Further, different components and characteristics of the colors in the color map may be used in the panels as inputs for the resulting color map. For example, different color spaces may have different components that correspond to the colors (e.g., hue, saturation, brightness, etc.). As another example, a panel may allow the user to configure other characteristics of the color map, such as a minimum saturation of the colors in the color map.

Figure 5B:
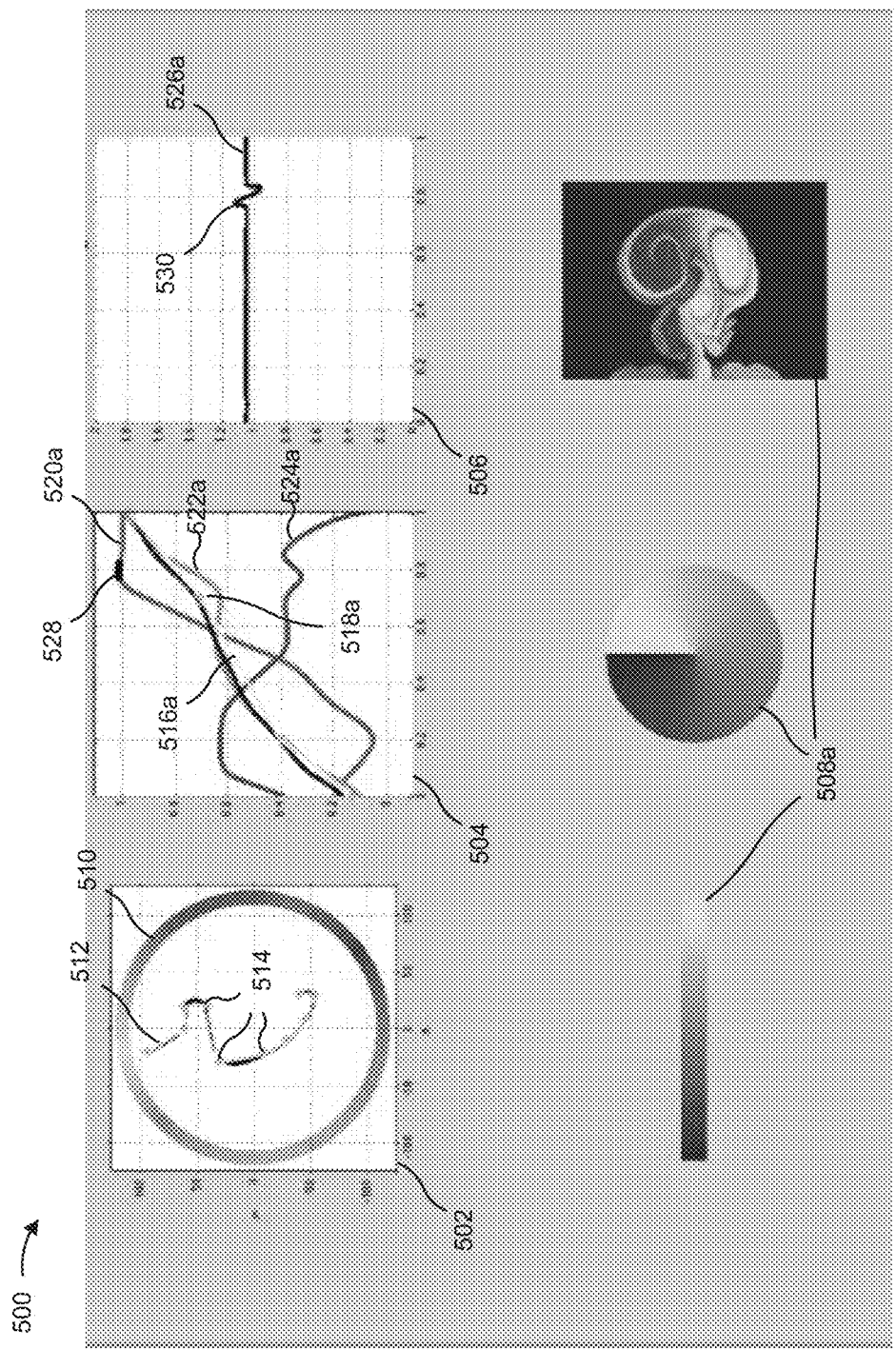
FIG. 5B illustrates an exemplary system for generating color maps.
Figure 5C:
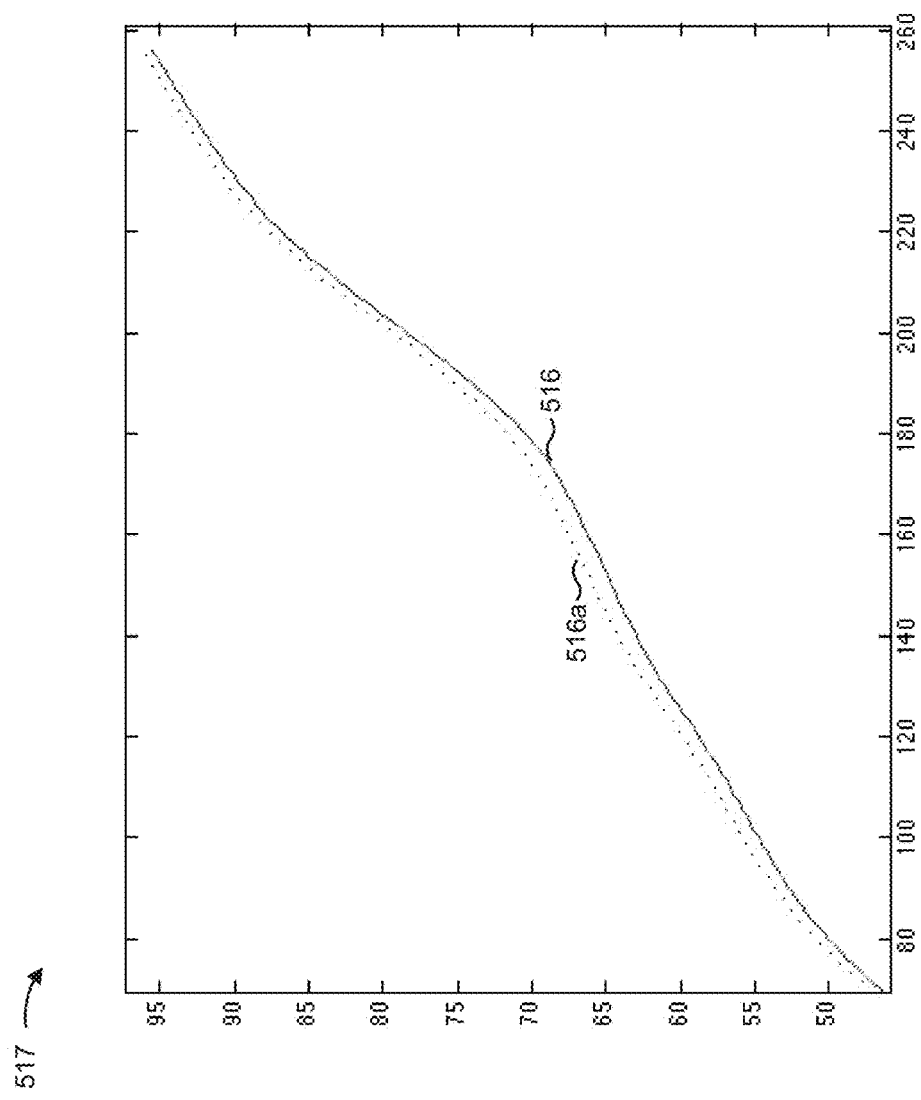
FIG. 5C illustrates a portion of an exemplary system for generating color maps.

FIG. 5B shows interface 500 of FIG. 5A, with a slight variation in the inputs. Interface 500 includes first panel 502 showing the same chromaticity plot 512 as FIG. 5A. Interface 500 includes second panel 504 with a slightly different lightness plot 516a. One or more lightness points 518a are raised slightly compared to corresponding lightness points 518 of FIG. 5A. The different lightness plots 516 and 516a are further shown in a comparison plot 517 in FIG. 5C. The slight change in lightness plot 516a results in a red plot 520a that is out of gamut, indicated by a black section 528 of red plot 520a. Green plot 522a and blue plot 524a may also reflect the change in lightness plot 516a even if green plot 522a and blue plot 524a remain in gamut. Red plot 520a illustrates the non-linear relationship between a design color space, such as L*a*b* and a deployment color space, such as RGB, e.g., a slight change in one color space produced a significant change in the other color space.

As the color map no longer remains in gamut across the entirety of the color map, third panel 506 shows a difference plot 526a that reflects a point at which the perceived difference is not constant. As a color that is out of gamut is modified before it can be displayed, the perceived difference between the modified color and a neighboring color is no longer uniform, as shown in difference plot 526a by a break 530. The resulting modified color map may be displayed in example outputs 508a.

Figure 5D:
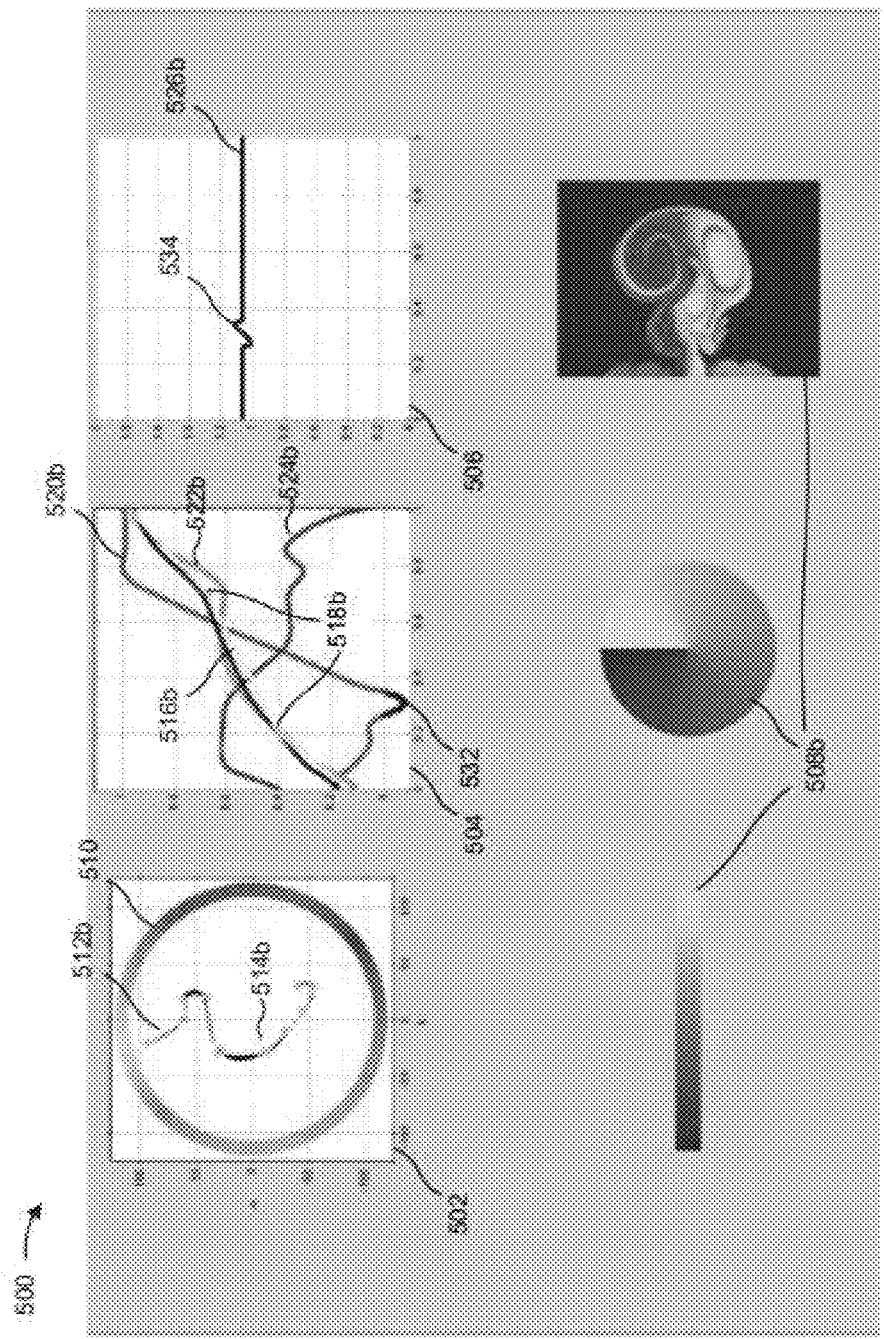
FIG. 5D illustrates an exemplary system for generating color maps.
Figure 5E:
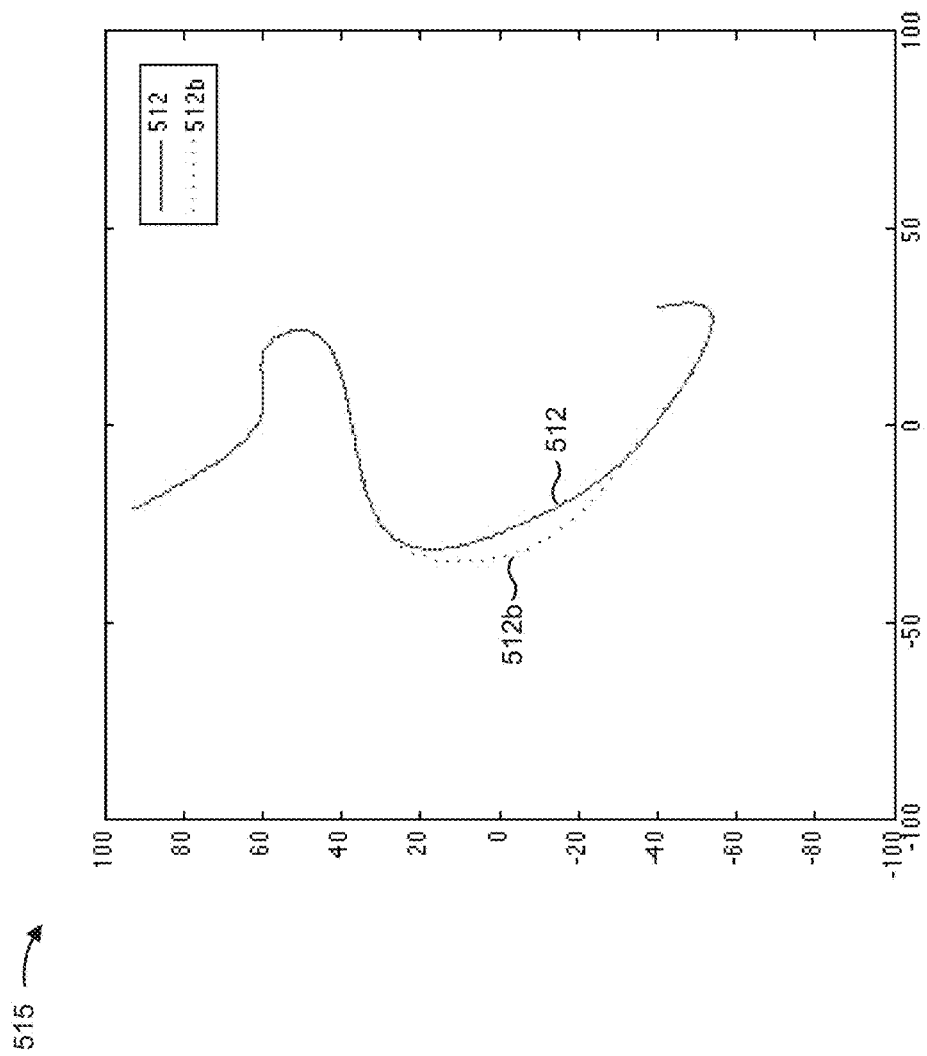
FIG. 5E illustrates a portion of an exemplary system for generating color maps.

FIG. 5D shows example interface 500 of FIGS. 5A and 5B, but with a different variation in the input design color space plots. Interface 500 includes first panel 502 with a slight adjustment in a chromaticity point 514b as compared to FIG. 5A, resulting in a slightly different chromaticity plot 512b as compared to chromaticity plot 512 of FIG. 5A. The different chromaticity plots 512 and 512b are further shown in a comparison plot 515 in FIG. 5E. Even though lightness plot 516 is the same as lightness plot 516 from FIG. 5A, the slight change in chromaticity plot 512b results in an output color map that is out of gamut. The portion that is out of gamut is visible in second panel 504, in a black section 532 of a red plot 520b. An out of gamut portion can occur when a value is out of range, such as dropping below or rising above a threshold value. In an embodiment, the threshold value can determine a boundary between an in gamut value and an out of gamut value. Similar to FIG. 5B, a green plot 522b and a blue plot 524b may also reflect the change in chromaticity plot 512b. Also similar to FIG. 5B, third panel 506 shows a difference plot 526b that has a break 534 in the uniformity of the perceived difference.

Figure 6A:
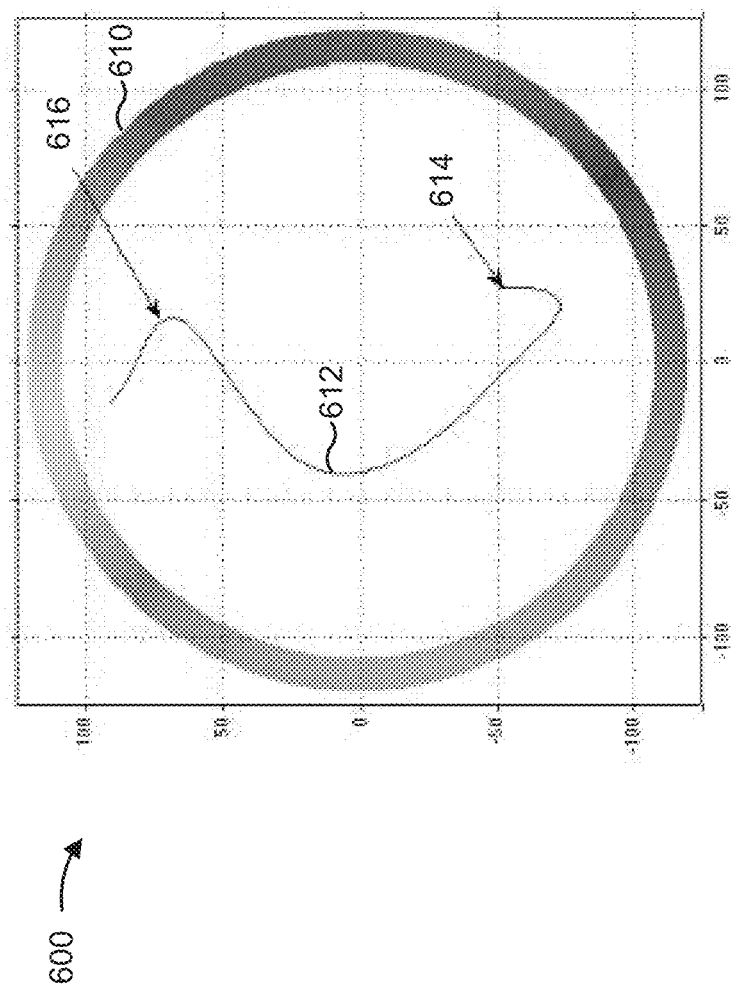
FIG. 6A illustrates an exemplary plot of a color map.

FIG. 6A illustrates an example chromaticity plot 612 of an example color map 600, such as color map 100 of FIG. 1. In some embodiments, chromaticity plot 612 includes a starting chromaticity point 614. In an embodiment, point 614 may reside in a purple/dark blue region of a color space. Chromaticity plot 612 may follow a path that takes chromaticity plot 612 through colors that are traditionally considered "cool" colors (e.g., green, blue, purple). Chromaticity plot 612 includes a chromaticity point 616 which is located in an orange region of the chromaticity plane. Chromaticity plot 612 may end in a yellow region. Thus, in this example, chromaticity plot 612 extends from the cool colors into colors that are traditionally considered "warm" (e.g., red, orange, yellow). Further, chromaticity plot 612 extends past the yellow region of the chromaticity plane before inflecting back into the yellow region.

In some embodiments, chromaticity plot 612 may include a minimum range of colors between a starting color and an ending color of the color map. For example, a threshold of a minimum total angle of the arc of chromaticity plot 612 may be applied. In some embodiments, chromaticity plot 612 may include a minimum saturation of the colors. For example, a threshold of a minimum distance from an origin of the chromaticity plane may be applied to chromaticity plot 612.

Figure 6B:
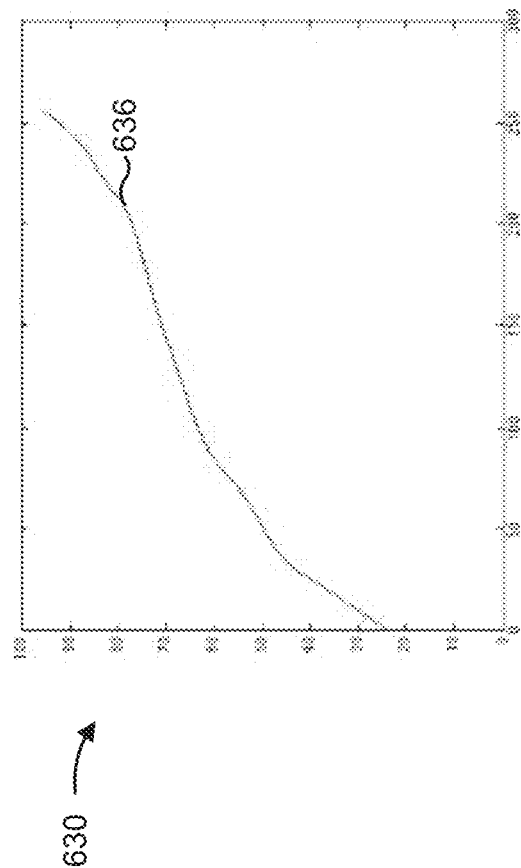
FIG. 6B illustrates an exemplary plot of a color map.

FIG. 6B illustrates an exemplary lightness plot 636 of an example color map 630, such as color map 100 of FIG. 1. In some embodiments, lightness plot 636 includes a set of monotonically increasing lightness points. As discussed above, the increasing lightness may allow the color map to more clearly represent differences in data values using the colors associated with the data values. Further, the increasing lightness may allow the color map to represent data when using grayscale in a manner that enables a user to clearly relate a data value to a shade of gray.

In some embodiments, lightness plot 636 is non-linearly increasing, which may allow the color map to remain in gamut. For example, other characteristics of the color map, such as perceptual uniformity and minimum saturation may be more easily maintained with a non-linearly increasing lightness. In alternative embodiments, lightness plot 636 may increase linearly while other components are adjusted to maintain characteristics of the color map.

Figure 7:
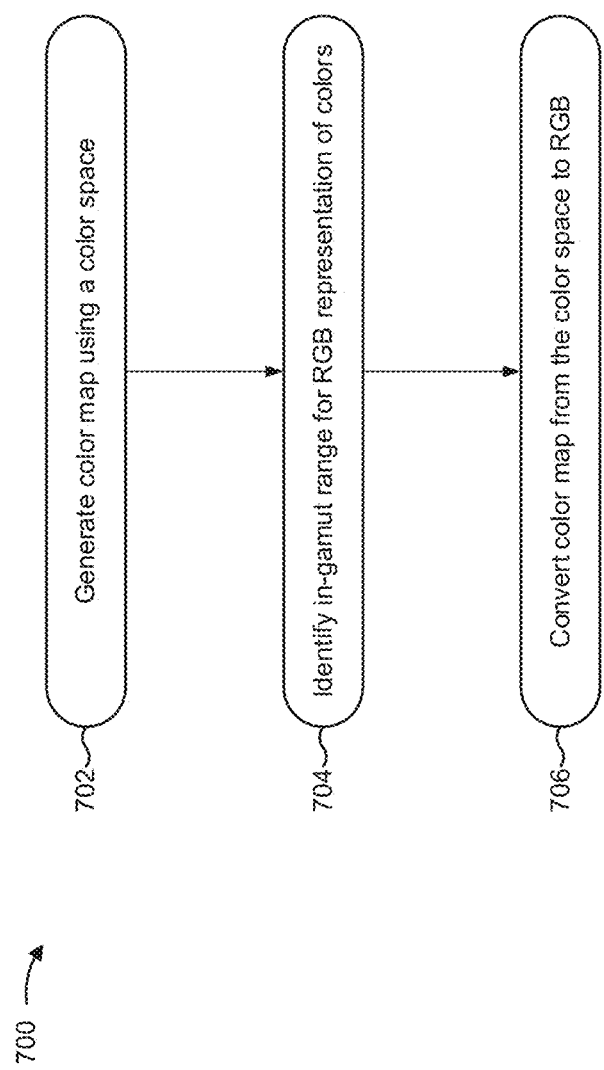
FIG. 7 is a flow chart of an example process for generating a color map.

FIG. 7 is a flow chart of an example process 700 for generating a color map. In act 702, a color map is generated using a color space. As described above, generating the color map may include selecting colors and specifying an order of the selected colors. The colors may be selected by selecting lightness points to generate a lightness plot. The lightness plot may be represented, for example, by an L* plot in the L*a*b* space. In some embodiments, the lightness plot may be a component based on luminance in a different color space.

Selecting colors may also include selecting chromaticity points to generate a chromaticity plot. The chromaticity plot may be represented, for example, by an a*b* plot in the L*a*b* space. In some embodiments, the chromaticity plot may be a component based on hue and saturation in a different color space.

Selecting colors may also include associating chromaticity values along the chromaticity plot with respective lightness values along the lightness plot. For example, a specific number of colors may be specified by sampling values along the chromaticity plot a specific number of times. Values on the lightness plot may be sampled the specific number of times and corresponding lightness values may be associated with the chromaticity values to specify each color. Generating the color map may include interpolating colors between the selected colors.

For example, a chromaticity plot may collectively have a starting point, an ending point and a number of intermediate points between the starting and ending points. A number of colors, for example thirty colors, may be selected by starting at the starting point of the chromaticity plot and dividing the plot into equal segments to result in thirty substantially equidistant values including the starting point, ending point, and a number of intermediate points. Values from the lightness plot may be similarly sampled to generate a perceptually uniformly spaced and ordered color map.

In act 704, an in-gamut range for RGB representation of the colors of the color map may be identified. The in-gamut range may be specified by a definition for a particular color space. For example, the RGB color space may be one of various color spaces based on the RGB color model, such as sRGB, scRGB, Adobe RGB, etc. The various RGB color spaces may include varying in-gamut ranges.

The color map generated in the color space, here L*a*b*, using the selected and interpolated colors may be checked to ensure the color map is in gamut in the RGB space. If any of the colors of the color map are determined to be out of gamut, the color map may be adjusted to bring the color map in gamut.

In act 706, the color map is converted from the color space to the RGB color space. As the color map has been determined to be within the in-gamut range of the RGB color space, the color map may be converted and displayed in the RGB color space. In some embodiments, converting the color map may include converting each set of numbers specifying the selected colors into a corresponding set of RGB numbers. The remainder of the colors of the color map may be interpolated in the RGB space.

Figure 8:
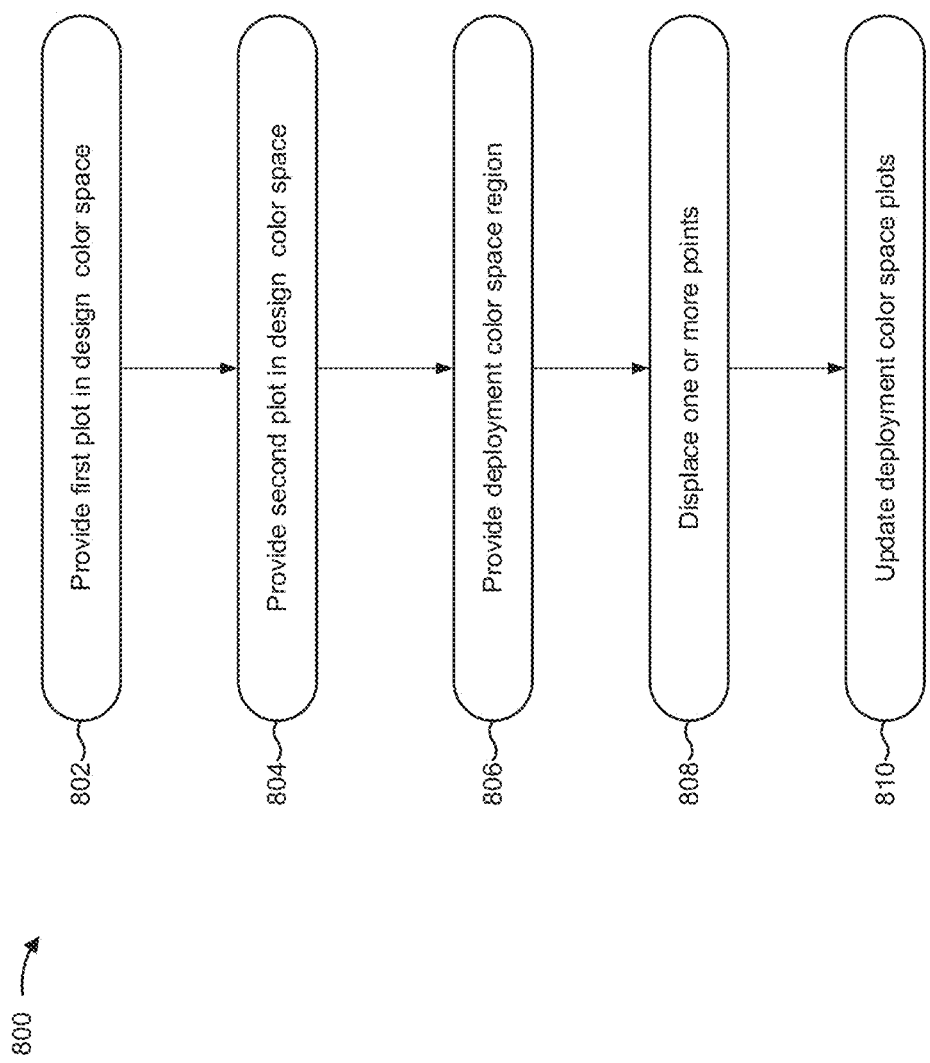
FIG. 8 is a flow chart of an example process for using a color map generator.

FIG. 8 is a flow chart of an example process 800 for using a color map generator. In act 802, a first plot in a first color space, e.g., a design color space, is provided. For example, as described above, the first plot in the design color space may be an L* plot in the L*a*b* color space. In other embodiments, other color spaces may be used and may use different component plots. As another example, the first plot in the design color space may be a Y plot in the CIE XYZ color space. The first plot may be described using points representing values of the first component (e.g., lightness). One or more of the first component points may be displaceable with respect to the first plot.

In act 804, a second plot in the design color space is provided. For example, as described above, the second plot may be an a*b* plot in the L*a*b* color space. Again, in other embodiments, other color spaces may be used. As another example, the second plot may be an XZ plot in the CIE XYZ color space. Similar to the first plot, the second plot may be described using points representing values of the second component (e.g., chromaticity). One or more of the second component points may be displaceable with respect to the second plot. For example, a designer may manipulate a point of the second plot to produce a modified plot.

In act 806, a second color space region, e.g., a deployment color space region, is provided. The deployment color space region may include component plots. For example, as described above, the deployment color space may be an RGB color space, including component red, green, and blue plots. In some embodiments, the deployment color space may be a different color space (e.g., a CMYK based color space, HSV (hue, saturation, value) color spaces, etc.) The component plots may represent, in the deployment color space, the plots of the design color space. For example, the red, green, and blue plots may represent the colors specified by the L* and a*b* plots of the L*a*b* color space.

In act 808, one or more points may be displaced with respect to one or more plots in the design color space. A displaced point may be from either of the first or second plots of the design color space (L* or a*b* plots). As the point is displaced, the plot may be updated to reflect a change in the plot. Alternatively, the plot may be updated when the point has been displaced. In act 810, the deployment color space region is updated to reflect the displaced point in the design color space. For example, the red, green, and/or blue plots may be updated to reflect the change in the colors represented by the updated design color space plots. In some embodiments, an indicator, e.g., an icon, may be provided to indicate whether the deployment color space component plots are in gamut.

In some embodiments, the one or more displaced points may be in one or more of the plots of the deployment color space, with the design color space updating to represent the changes to the deployment color space. For example, if a displacement in the design color space results in an out-of-gamut color map in the deployment color space, the one or more plots that are out of gamut in the deployment color space may be adjusted directly to bring the color map back in gamut. The direct adjustments to the deployment color space may be reflected by changes in the design color space.

Figure 9:
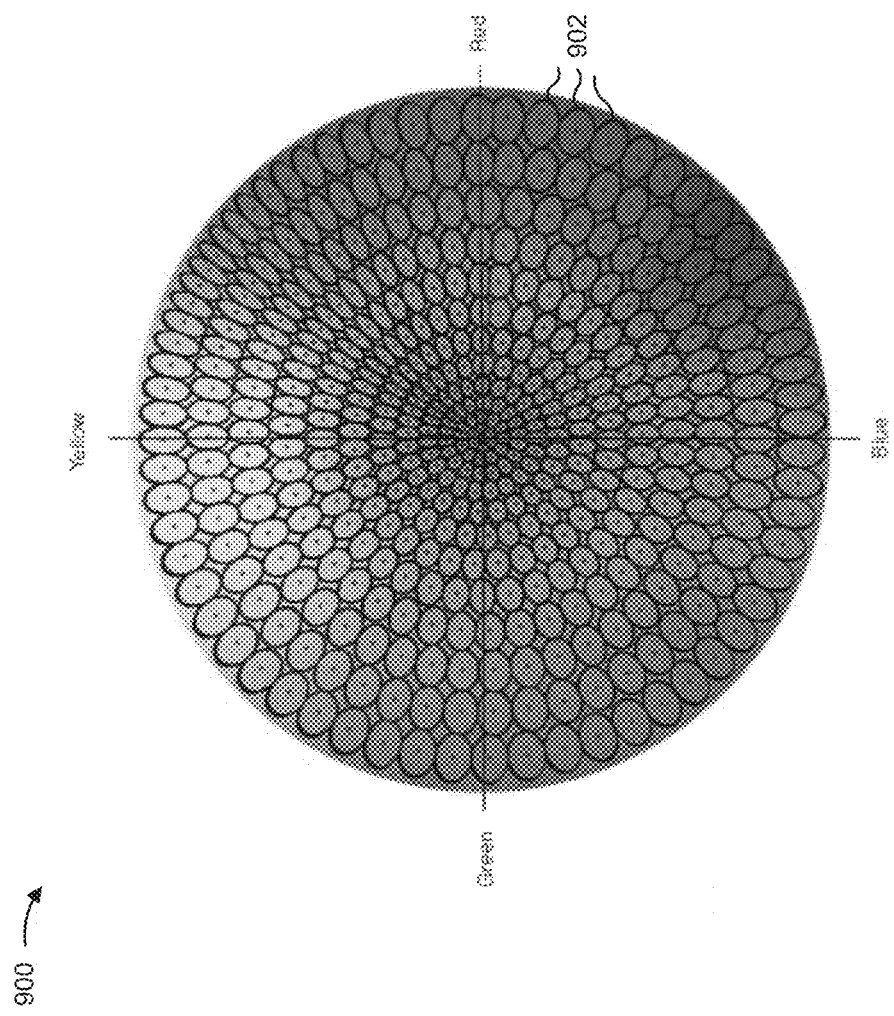
FIG. 9 illustrates an exemplary color chart that can be used for practicing aspects of the invention.

Embodiments described herein have generally referred to the CIE L*a*b* color space as the design color space and the RGB color space as the deployment color space; however, other color spaces may be used consistent with disclosures made herein. Further, while specific colors have been mentioned, other colors may be used. For example, while colors may be specified by a set of numbers in a color space, a small change in one or more of the numbers may result in a color that is technically, but nearly imperceptibly, different. For example, colors that are within a perceptual tolerance may be considered substantially the same. FIG. 9 shows an example color chart 900 with an example perceptual tolerance. Colors within each of tolerance ellipsoids 902 may be difficult for a person to perceive as representing different colors and as such may be considered to substantially represent a same color. In other embodiments, other appropriate tolerance measures may be used, such as CIE76, CIE94, CIEDE2000, etc.

TCE 220 may provide a computing environment that may allow, for example, a user to perform tasks related to disciplines, such as, but not limited to, mathematics, science, engineering, medicine, business, biology, finance, etc. TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 220. During run-time, when the statement "A='hello' is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 performs matrix and/or vector computations that may be used for data analysis, data visualization, application development, simulation, modeling, and/or algorithm development. These matrix and/or vector formulations may be used in many areas, such as, but not limited to, statistics, image processing, signal processing, control design, life sciences modeling, financial modeling, discrete event analysis and/or design, and state-based analysis and/or design.

TCE 220 provides mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). Embodiments of TCE 220 may be configured to improve runtime performance when performing computing operations. For example, TCE 220 may include a just-in-time (JIT) compiler in an exemplary embodiment.

Examples of TCEs and/or TCE-like applications that may be adapted to implement one or more embodiments of the invention may include, but are not limited to applications that implement languages such as the MATLAB® environment available from The MathWorks, Inc.; GNU Octave from the GNU Project; Mathematica from Wolfram Research, Inc.; Mathcad from Mathsoft Engineering & Education Inc.; Maple from Maplesoft; Scilab from The French Institution for Research in Computer Science and Control (INRIA).

CONCLUSION

Exemplary embodiments provide a computer-implemented technique for generating and using a color map.

The foregoing description of implementations provides illustration and description, but is not intended to be exhaustive or to limit the invention to the precise form disclosed. Modifications and variations are possible in light of the above teachings or may be acquired from practice of the invention.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more operations. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors, cause the one or more processors to:
select a plurality of lightness points for a color map to be generated using a color space, the plurality of lightness points representing a plurality of lightness values;
generate a lightness plot based on the plurality of lightness points,
the lightness plot non-linearly increasing from a minimum lightness value to a maximum lightness value,
select a plurality of chromaticity points,
the plurality of chromaticity points being represented using a plurality of dimensions, and
the plurality of chromaticity points representing a plurality of chromaticity values;
generate a chromaticity plot based on the plurality of chromaticity points;
associate chromaticity values along the chromaticity plot with respective lightness values along the lightness plot,
associating the chromaticity values along the chromaticity plot with the respective lightness values along the lightness plot specifying a plurality of colors;
identify an in-gamut range for a red, green, blue (RGB) representation of the plurality of colors,
the RGB representation being provided in a RGB color space;
convert the color map from the color space to the RGB color space by generating in-gamut RGB representations of the plurality of colors; and
utilize the converted color map to represent data for display.

2. The computer-readable medium of claim 1, where the color map is generated in an L*a*b*-based color space.

3. The computer-readable medium of claim 2, where the one or more instructions, when executed by the one or more processors, further cause the one or more processors to:
include orange proximate to yellow in the in-gamut RGB representations.

4. The computer-readable medium of claim 1, where the one or more instructions, when executed by the one or more processors, further cause the one or more processors to:
associate the minimum lightness value with one of blue or purple, and associate the maximum lightness value with yellow.

5. The computer-readable medium of claim 1, where the one or more instructions, when executed by the one or more processors, further cause the one or more processors to:
generate the in-gamut RGB representations using a technical computing environment.

6. The computer-readable medium of claim 1, where the one or more instructions, when executed by the one or more processors, further cause the one or more processors to:
represent data values using the in-gamut RGB representations of the plurality of colors.

7. The computer-readable medium of claim 1, where the color map is generated in a perceptually uniform color space.

8. A method comprising:
selecting a plurality of lightness points for a color map to be generated using a color space,
the plurality of lightness points representing a plurality of lightness values, and
the selecting the plurality of lightness points being performed by one or more devices;
generating a lightness plot based on the plurality of lightness points,
the lightness plot non-linearly increasing from a minimum lightness value to a maximum lightness value, and
the generating the lightness plot being performed by the one or more devices;
selecting a plurality of chromaticity points:
the plurality of chromaticity points being represented using a plurality of dimensions, and
the plurality of chromaticity points representing a plurality of chromaticity values, and
the selecting the plurality of chromaticity points being performed by the one or more devices;
generating a chromaticity plot based on the plurality of chromaticity points,
the generating the chromaticity plot being performed by the one or more devices;
associating chromaticity values along the chromaticity plot with respective lightness values along the lightness plot,
the associating the chromaticity values along the chromaticity plot with the respective lightness values along the lightness plot specifying a plurality of colors, and
the associated chromaticity values being performed by the one or more devices;
identifying an in-gamut range for a red, green, blue (RGB) representation of the plurality of colors,
the RGB representation being provided in a RGB color space, and
the identifying the in-gamut range being performed by the one or more devices;
converting the color map from the color space to the RGB color space by generating in-gamut RGB representations of the plurality of colors,
the converting the color map being performed by the one or more devices; and
utilizing the converted color map to represent data for display,
the utilizing the converted color map being performed by the one or more devices.

9. A method comprising:
selecting a plurality of luminance points for a color map to be generated using a perceptually uniform color space,
the selecting the plurality of luminance points being performed by one or more devices;
generating a non-linear luminance curve comprising the plurality of luminance points within a color map,
the generating the non-linear luminance curve being performed by the one or more devices;
generating a chrominance curve within the color map,
the chrominance curve including a plurality of chromaticity points, and pairings of the plurality of luminance points and the plurality of chromaticity points,
the pairings representing colors,
the colors representing data values and being arranged with a perceptually uniform spacing, and
the generating the chrominance curve being performed by the one or more devices;
applying an in-gamut red, green, blue (RGB) color map to a data set,
the applying being performed by the one or more devices, and
the data set including the data values; and utilizing the in-gamut RGB color map to represent at least a portion of the data set,
the in-gamut RGB color map representing the data values using the colors arranged with the perceptually uniform spacing, and
utilizing the in-gamut RGB color map being performed by the one or more devices.

10. The method of claim 9, where the perceptually uniform color space includes a perceived color difference.

11. The method of claim 10, further comprising:
identifying a first pair of adjacent colors,
the first pair of adjacent colors representing a first data value using a first color and a second data value using a second color, and
the first data value and the second data value including the perceived color difference; and
identifying a second pair of adjacent colors,
the second pair of adjacent colors being different than the first pair of adjacent colors,
the second pair of adjacent colors representing a third data value using a third color and a fourth data value using a fourth color, and
the third data value and the fourth data value including the perceived color difference.

12. The method of claim 9, where the perceptually uniform color space is an L*a*b* color space.

13. A computer-readable medium storing instructions, the instructions comprising:
one or more instructions that, when executed by one or more processors, cause the one or more processors to:
select a plurality of luminance points for a color map to be generated using a perceptually uniform color space;
generate a non-linear luminance curve comprising a the plurality of luminance points within a color map;
generate a chrominance curve within the color map,
the chrominance curve being represented by using a plurality of dimensions, a plurality of chromaticity points, pairings of the plurality of luminance points and the plurality of chromaticity points,
the pairings representing colors,
the colors representing data values, and being arranged with a perceptually uniform spacing;
apply an in-gamut red, green, blue (RGB) color map to a data set,
the data set including the data values; and
utilize the in-gamut RGB color map to represent at least a portion of the data set,
the in-gamut RGB color map representing the data values
using the colors arranged with the perceptually uniform spacing.

14. A device comprising:
one or more processors to:
select a plurality of L* points for a color map to be generated using a uniform color space;
provide a color space L* plot,
the color space L* plot comprising the plurality of L* points, and
at least one of the plurality of L* points being displaceable with respect to the color space L*plot;
provide a color space a*b* plot,
the color space a*b* plot comprising a plurality of a*b* points,
the plurality of a*b* points being related to the plurality of L* points, and
at least one of the plurality of a*b* points being displaceable with respect to the color space a*b* plot;
provide a red, blue, green (RGB) color space region,
the RGB color space region comprising a R plot, a G plot, and a B plot, the R plot, G plot, and B plot representing the plurality of L* points and plurality of the a*b* points in the RGB color space region;
displace one or more of the plurality of L* points with respect to the color space L* plot, or one or more of the plurality of a*b* points with respect to the color space a*b* plot;
associate the one or more of the plurality of L* points with the one or more of the plurality of a*b* points;
update one or more of the R plot, the G plot, or the B plot based on the displacing;
determine and indicate, based on the updating, whether the updated one or more of the R plot, the G plot, or the B plot are in gamut; and
utilize the updated one or more of the R plot, the G plot, or the B plot to represent a plurality of data values.

15. The device of claim 14, where the one or more processors are further to:
receive information associated with an interaction with a technical computing environment; and
provide the color space L* plot, provide the color space a*b* plot, or provide the RGB color space region i based on the information associated with the interaction.

16. The device of claim 14, where the one or more processors are further to:
generate the color map based on the updated one or more of the R plot, the G plot, or the B plot.

17. The device of claim 16, where the one or more processors are further to:
apply the color map to the plurality of data values.

18. A computer-readable medium storing instructions, the instructions comprising:
one or more instructions that, when executed by one or more processors, cause the one or more processors to:
provide a first plot in a first color space region,
the first plot representing a first component of the first color space region,
the first plot comprising a plurality of first component points, and
at least one of the plurality of first component points being displaceable with respect to the first plot;
provide a second plot in the first color space,
the second plot representing a second component of the first color space region,
the second plot comprising a plurality of second component points, and
at least one of the plurality of second component points being displaceable with respect to the second plot;
provide a second color space region,
the second color space region comprising a plurality of second color space component plots,
the plurality of second color space component plots representing, in the second color space region, the plurality of first component points and the plurality of second component points of the first color space region;

displace either one or more of the plurality of first component points with respect to the first plot or one or more of the plurality of second component points with respect to the second plot;

update one or more of the plurality of second color space component plots based on the displacing;

determine and indicate whether the updated one or more of the plurality of second color space component plots are in gamut; and utilize the updated one or more of the plurality of second color space component plots to represent data for display.

19. The computer-readable medium of claim 18, where the instructions further comprise:

one or more instructions that, when executed by the one or more processors, cause the one or more processors to:

generate a color map based on the updated one or more of the plurality of second color space component plots.

20. The computer-readable medium of claim 19, where the instructions further comprise:

one or more instructions that, when executed by the one or more processors, cause the one or more processors to:

apply the color map to a plurality of data values.

* * * * *

UNITED STATES PATENT AND TRADEMARK OFFICE
CERTIFICATE OF CORRECTION

| | |
|---|---|
| PATENT NO. | : 9,613,435 B1 |
| APPLICATION NO. | : 14/335588 |
| DATED | : April 4, 2017 |
| INVENTOR(S) | : Steven L. Eddins |

It is certified that error appears in the above-identified patent and that said Letters Patent is hereby corrected as shown below:

In the Claims

Please correct Claim 8 as follows:
Column 16, Line 8, after "the plurality of chromaticity points being represented using a plurality of dimensions," delete "and".

Please correct Claim 15 as follows:
Column 18, Line 29, after "or provide the RGB color space region" delete "i".

Signed and Sealed this
Thirtieth Day of May, 2017

Michelle K. Lee
*Director of the United States Patent and Trademark Office*